United States Patent [19]
Shen et al.

[11] Patent Number: 5,748,359
[45] Date of Patent: May 5, 1998

[54] INFRARED/OPTICAL IMAGING TECHNIQUES USING ANISOTROPICALLY STRAINED DOPED QUANTUM WELL STRUCTURES

[75] Inventors: Paul H. Shen, North Potomac; Mitra Dutta, Silver Spring; Michael Wraback, Rockville, all of Md.; Jagadeesh Pamulapati, Washington, D.C.

[73] Assignee: The United States of America as represented by the Secretary of the Army, Washington, D.C.

[21] Appl. No.: 754,004

[22] Filed: Nov. 21, 1996

[51] Int. Cl.⁶ ................................................ G02F 1/03
[52] U.S. Cl. ................................................ 359/248; 359/245
[58] Field of Search .............................. 359/248, 237, 359/245, 276, 629

[56] References Cited

U.S. PATENT DOCUMENTS

| | | | |
|---|---|---|---|
| 4,879,763 | 11/1989 | Wood | 359/168 |
| 5,107,307 | 4/1992 | Onose et al. | 257/15 X |
| 5,274,247 | 12/1993 | Dutta et al. | 359/248 |
| 5,381,260 | 1/1995 | Ballato et al. | |

OTHER PUBLICATIONS

Shen et al, "Optical anisotropy in GaAs/Al$_x$Ga$_{1-x}$As multiple quantum wells under thermally induced uniaxial strain", Pysical Review B47 pp. 13933–13936, 15 May 1993.

*Primary Examiner*—Frank G. Font
*Assistant Examiner*—Reginald A. Ratliff
*Attorney, Agent, or Firm*—Michael Zelenka; William H. Anderson

[57] ABSTRACT

An imaging system for transferring an infrared (IR) image to a visible image. The imaging system includes a polarization rotator that rotates the polarization of a visible light beam in response to absorptions of radiation from the IR image. A polarizer outputs components of the visible light beam as a function of the amount of absorbed radiation from the IR image. The polarization rotator is formed from a multiple quantum well structure grown on a semiconductor substrate with a thermally induced uniaxial, in-plane, compressive strain. The multiple quantum well structure includes a heterostructure of undoped barrier layers and doped quantum well layers. The strain causes the quantum well layers to have anisotropic radiation absorption characteristics. In particular, orthogonal components of the visible light parallel to and perpendicular to the strain will experience different degrees of absorption. The dopant in the quantum well layers is sufficient to bleach the lowest exciton resonances, thereby reducing absorption of the light beam. IR absorption from the image decreases the bleaching and increases the ability of the quantum well layers to promote exciton transitions. As such, the polarization of the light beam rotates as a function of the amount of IR absorbed from the image.

21 Claims, 1 Drawing Sheet

INFRARED/OPTICAL IMAGING TECHNIQUES USING ANISOTROPICALLY STRAINED DOPED QUANTUM WELL STRUCTURES

GOVERNMENT INTEREST

The invention described herein may be manufactured, used, sold, imported and licensed by or for the Government of the United States of America without the payment to us of any royalty thereon.

FIELD OF THE INVENTION

This invention relates to infrared/optical systems having multiple quantum well (MQW) structures. More specifically, the invention relates to techniques of providing anisotropically strained, doped, MQW structures for constructing optical/infrared imaging devices.

BACKGROUND OF THE INVENTION

Infrared (IR) and thermal image converters and detectors have been used successfully in a number of fields. Night vision devices employ IR image converters to generate visible images of objects located in low-light environments. IR image converters and/or detectors interconnected to computers have found a variety of applications ranging from missile guidance to medical diagnostics. IR cameras with image converters connected to charge-coupled devices (CCD's) have been used by manufacturers in a variety of test and inspection equipment.

Prior art imaging systems usually require that middle IR images (wavelengths from 1,500 nm to 6,000 nm) and/or far IR images (wavelengths from 6,000 nm to 40,000 nm) be converted to visible images or near IR images (wavelengths from 770 nm to 1,500 nm). For instance, visible images are usually required in night vision devices, while near IR images often form the input to CCD arrays of many computer systems and IR cameras.

Most conventional systems using IR image converters or detectors convert IR images to electric signals in the form of a pixel array. Readout circuits use these electrical signals to energize a corresponding pixel array of display devices. Additionally, many of these imaging systems use an electric barrier or filter device for each pixel to reduce any dark electric signal that may be present. In many prior art applications, conventional IR and thermal image converters and/or detectors have served the purpose. However, IR imaging systems that contain a large number of pixels often include a complex network of interconnected components, rendering such systems bulky and expensive to manufacture. As such, those concerned with the development of IR imaging systems have recognized the need for reducing their size, complexity and cost. The present invention fulfills this need.

SUMMARY OF THE INVENTION

The general purpose of this invention is to provide an imaging system for transferring an image at one frequency to an image at a second frequency. The imaging system includes a polarization rotator having a semiconductor substrate and a multiple quantum well structure (MQW) mounted on the substrate. The MQW has a heterostructure of un-doped barrier layers and doped quantum well layers. The MQW has a uniaxial compressive strain in the plane of the layers such that the doped quantum well layers have anisotropic radiation absorption characteristics at a first frequency. A first source directs radiation of a first frequency normal to the layers and linerally polarized in the plane of the layers. The radiation at the first frequency has components directed parallel to and perpendicular to the direction of the strain. A second source of radiation at a second frequency directs radiation at the MQW such that radiation absorption at the second frequency lowers the free carrier population of the doped quantum well layers and increase radiation absorption at the first frequency.

A more specific aspect of the present invention is an imaging ststem comprising a radiation source emitting linerally polarized radiation at a first frequency and an image emitting radiation at a second frequency. A polarization rotator has an input for receiving the radiations from the radiation source and the image, an output for emitting the linerally polarized radiation at the first frequency, an absorption means for absorbing radiation at the second frequency, and rotation means for rotating the polarization of the radiation at the first frequency in response to absorption of the radiation at the second frequency. A polarizer transmits a polarized component of the radiation emitted from the output.

Still further, the invention includes a method of fabricating a polarization rotator capable of rotating the polarization of radiation at a first frequency in response to absorption of radiation at a second frequency. The method comprising the steps of: forming a semiconductor substrate; and growing a multiple quantum well structure (MQW) on the substrate in the form of a heterostructure of un-doped barrier layers and doped quantum well layers such that exciton transitions from the highest quantum levels in the valence band to the lowest quantum level in the conduction band correspond to the first frequency and carrier transitions to continuum levels correspond to the second frequency; and producing a uniaxial compressive strain in the MQW in the plane of the layers.

The exact nature of this invention, as well as other objects and advantages thereof, will be readily apparent from consideration of the following specification relating to the annexed drawing.

DETAILED DESCRIPTION OF THE PREFERRED EMBODIMENTS

Figure 1:
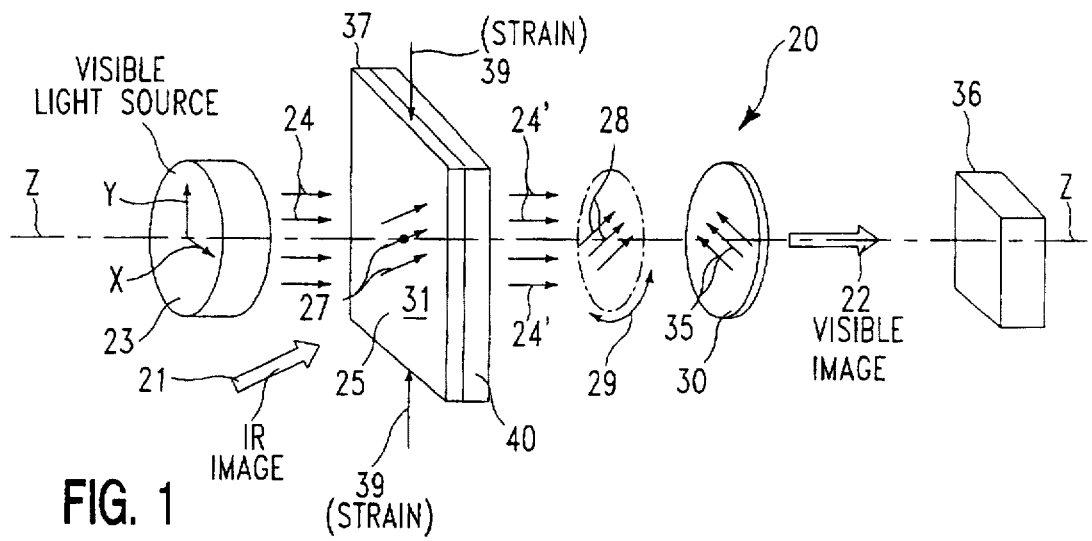
FIG. 1 is a pictorial schematic block diagram of an image converter for transferring an infrared image into a visible image in accordance with the present invention.

Referring now to FIG. 1, infrared (IR) image converter 20 transfers IR image 21 into visible image 22. IR image converter 20 includes visible light source 23, which directs visible light beam 24 normal to entrance face 31 of transparent polarization rotator 25. Light beam 24 travels parallel to the Z axis of a rectangular X-Y-Z coordinate system depicted on the left face of light source 23. Entrance face 31 lies in a plane parallel to the X-Y plane. The polarization of light beam 24 is linear and points at a forty-five degree angle with respect to the X axis, as depicted by arrows 27 located on entrance face 31.

Polarization rotator 25, a monolithically integrated semiconductor, comprises multiple quantum well structure (MQW) 37 mounted on transparent semiconductor substrate 40. MQW 37 generally rotates the polarization direction of light beam 24 about the Z axis as beam 24 propagates through polarization rotator 25. As such, light beam 24 emerges from substrate 40 as a translated version of light beam 24, designated here and in FIG. 1 as light beam 24'. Arrows 28 represent the polarization direction of light beam 24'. Double-headed arrow 29 indicates that polarization rotator 25 rotates the polarization direction of light beam 24' about the Z axis.

High-contrast polarizer 30 mounts in a plane parallel to the X-Y plane and faces the output of polarization rotator 25. As such, light beam 24' strikes polarizer 30 normal to its input surface. After passing through polarizer 30, light beam 24' illuminates utilization device 36, which may be an output lens, a projection screen, an array of charge coupled devices, or the like. Of course, the amount of radiation from light beam 24' that illuminates utilization device 36, depends on the relative polarization directions of light beam 24' and polarizer 30. Thus, as the polarization direction of light beam 24' rotates about the Z axis (see arrow 29 in FIG. 1), polarizer 30 will transmit different amounts of radiation from light beam 24'.

In the present invention, polarizer 30 mounts with its polarization direction (see arrows 35) perpendicular to that of light beam 24' (see arrows 28) in the absence of any IR image 21. Therefore, when initalizing IR image converter 20, the operator energizes visible light source 23, blocks IR image 21, and rotates polarizer 30 about the Z axis until no light appears at its output. In this initialized position, arrows 28 and 35 are perpendicular. Polarizer 30 is placed in this position to reduce background light illumination and improve the signal-to-noise ratio of IR image converter 20.

Figure 2:
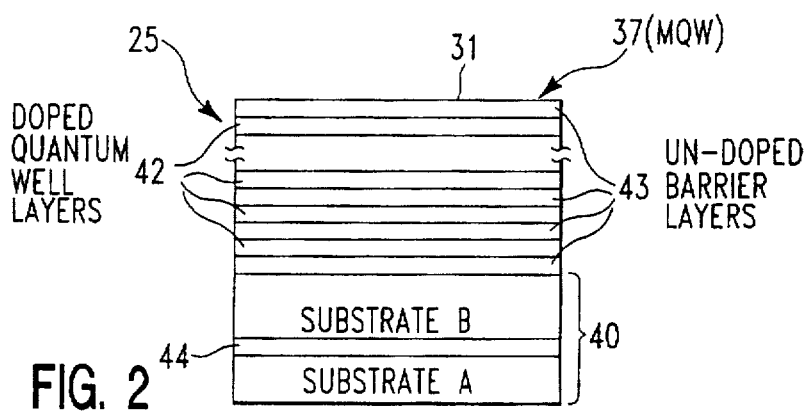
FIG. 2 is a schematic elevation of a monolithically integrated semiconductor structure which functions as a polarization rotator and forms a part of the FIG. 1 image converter.

MQW 37 may be fabricated using conventional techniques including molecular beam epitaxy (MBE). As seen in FIG. 2, MQW 37 is a heterostructure grown on composite transparent substrate 40. MQW 37 comprises a series of doped quantum well layers 42 alternately sandwiched between un-doped barrier layers 43. Transparent substrate 40 comprises a composite of transparent substrates A and B joined by a transparent adhesive layer 44. Substrate 40 and MQW 37 possess a thermally induced, in-plane, uniaxial, anisotropic, compressive strain in the direction of arrows 39 of FIG. 1. This compressive strain may be produced using well known processes, including methods described in U.S. Pat. No. 5,381,260, issued to Ballato et al.

Using a Ballato et al. method as an example, the fabricator initially selects materials for substrates A and B such that substrate A has a direction-dependent thermal expansion and a coefficient of thermal expansion that differs from that of substrate B. The fabricator then grows MQW 37 on substrate B. Next, the fabricator fixes substrate B to substrate A with transparent adhesive 44 at an elevated temperature. Upon cooling the heated structure down to room temperature, the difference in thermal expansion characteristics of substrates A and B thermally induces an anisotropic compressive strain, which in the present case is directed parallel to the Y axis (see arrows 39 in FIG. 1).

This anisotropic strain causes the exciton absorption characteristics of MQW 37 to be anisotropic. It is well known that for a MQW having a compressive strain oriented in the Y direction, as shown in FIG. 1, exciton absorption of a light beam that is linearly polarized in the strain direction, i.e., the Y direction, will be less than that for a similar light beam polarized in the X direction. However, for the present case, where visible light beam 24 is linearly polarized at a forty-five degree angle to the X axis, the Y component of light beam 24 will be absorbed less than its Y component. The result of this anisotropic absorption is that the polarization direction of the output beam, light beam 24', will be rotated with respect to that of the input beam, light beam 24.

Figure 3:
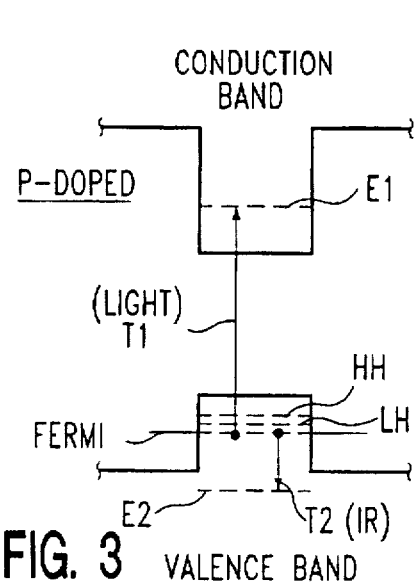
FIGS. 3 and 4 are energy band diagrams illustrating an energy profile for a quantum well in the semiconductor structure of FIG. 2, which is useful in understanding the operation of the present invention.
Figure 4:
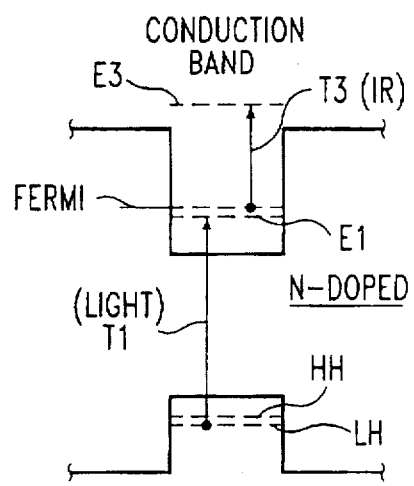

The ability of MQW 37 to rotate the polarization of light beam 24 depends, however, on the ability of quantum well layers 42 to generate exciton absorptions in response to light beam 24. In the present invention, dopants are added to quantum well layers 42 to provide a mechanism for controlling the ability to generate these exciton absorptions and, therefore, to control the amount of rotation of the polarization direction of light beam 24'. In particular, these dopants provide a mechanism whereby the absorption of radiation from IR image 21 controls the carrier population associated with exciton absorptions in quantum well layers 42. FIGS. 3 and 4 provide energy band diagrams useful in understanding how polarization rotator 25 controls the polarization rotation of light beam 24'.

The diagrams of FIGS. 3 and 4 depict energy band diagrams for doped quantum well layer 42. The FIG. 3 energy band diagram pertains to an embodiment of the invention in which quantum well layer 42 contains P-type dopant. The FIG. 4 energy band diagram relates to an alternate embodiment in which quantum well layer 42 contains N-type dopant.

When growing MQW 37 on substrate B using P-type dopant material, which may be accomplished using conventional techniques including MBE, the fabricator tailors the constituent materials and adjusts the width of doped quantum well layers 42 such that (see FIGS. 1 and 3): a) exciton transition T1, from the highest quantum levels in the valence band to the lowest quantum level E1 in the conduction band, lies in the visible light range of light beam 24; b) the quantum splitting of the heavy hole (HH) and light hole (LH) levels is small, due to the anisotropic in-plane strain (see arrows 39 in FIG. 1), so that a strong coupling of the HH and LH levels exists; c) hole transition T2, from the first HH-LH coupled subband levels to the hole continuum E2 in the valence band, lies in the IR frequency range of IR image 21; and d) the doping level in quantum well layers 42 falls slightly above the first coupled subband level, which approximates the Fermi level. This doping condition leads to bleaching of the lowest exciton resonances due to the short range exchange interaction associated with the exclusion principle. Consequently, this bleaching substantially reduces the ability of quantum well layers 42 to promote exciton transitions T1, and, therefore, to effect the polarization direction of output light beam 24'. However, when radiation from IR image 21 reaches the P-doped quantum wells 42, that IR radiation promotes hole transitions T2, thereby changing the hole population in the lowest subband. This reduces the bleaching of the exciton resonance, increases the ability of quantum well layers 42 to generate exciton transitions T1 in response to light beam 24, and, therefore, to rotate the polarization direction of light beam 24'.

Thus, in the present invention, radiation from IR image 21 promotes hole transitions T2, thereby reducing the hole population in the lowest subband and decreasing the bleaching of the exciton resonance. This reduced bleaching increases the ability of light beam 24 to promote exciton transitions T1, resulting in a dynamic polarization of visible light beam 24' and a dynamic increase in the transmission of visible light beam 24' by polarizer 30. The output of polarizer 30, transferred visible image 22, illuminates utilization device 36. In this way, IR image converter 20 transfers IR image 21 to visible image 22 by using a visible light beam and a polarization rotation mechanism of a strained, doped quantum well structure.

In an alternate embodiment (see FIG. 4), where doped quantum well layers 42 contain N-type dopant, the fabricator tailors the constituent materials and adjusts the width of doped quantum well layers 42 such that transition T3 from the first quantum level E1 in the conduction band to the electron continuum E3 in the conduction band lies in the IR frequency range of IR image 21. Additionally, the N-type doping level in quantum well layers 42 falls slightly above the first electron level E1. This condition leads to bleaching of the lowest exciton resonance. Again, this bleaching substantially reduces the ability of quantum well layers 42 to promote exciton transitions T1 in response to light beam 24. However, when radiation from IR image 21 reaches the N-doped quantum wells 42, it promotes electron transitions T3, thereby reducing the electron population in the lowest quantum levels E1 of the conduction band. Thus, the bleaching of the exciton resonance is reduced, which increases the ability of quantum well layers 42 to generate exciton transitions T1 in response to light beam 24. Consequently, MQW 37 dynamically rotates the polarization direction of light beam 24' and increases its transmission through polarizer 30 as visible image 22. Again, IR image converter 20 transfers IR image 21 to visible image 22.

Obviously many other modifications and variations of the present invention are possible in the light of the above teachings. Of course, it will be obvious to skilled artisans that image converter 20 may contain a single polarization rotator 25, or a plurality of polarization rotators 25 mounted in a pixel array. In the latter instance, where a pixel array of polarization rotators 25 are used, image converter 20 remains uncomplicated since only a single polarizer 30 and a single light source 23 will be required.

Further, the inventive technique has general application to image converters that transfer middle IR images (wavelengths from 1,500 nm to 6,000 nm) and/or far IR images (wavelengths from 6,000 nm to 40,000 nm) into visible images or near IR images (wavelengths from 770 nm to 1,500 nm). For example, image converter 20 may be modified to transfer middle or far IR images into near IR images. In that case, visible light source 23 would be replaced with a near IR radiation source. Additionally, MQW 37 would be tailored such that exciton transition T1 would be in the near IR frequency range, and IR transitions T2 and T3 would be in either the middle or far IR frequency range. Of course, other frequency ranges are applicable to the present invention and will become obvious to those skilled in these arts.

Also, the compressive strain of MQW 37 may be induced using a variety of well known techniques other than that described above. Further, polarization rotator 25 may be fabricated from a assortment of well known semiconductor materials. One preferred combination of materials applicable to the FIG. 2 structure includes the following: substrate A is formed from lithium tantalate ($LiTaO_3$); substrate B is formed from gallium arsenide (GaAs); adhesive layer 44 may be composed of ultraviolet curing glue such as Norland #81; un-doped barrier layers 43 may be grown from aluminum gallium arsenide (AlGaAs); and doped well layers 42 may be grown from gallium arsenide (GaAs). Other combinations of material of equal importance will be obvious to those skilled in these arts.

It is therefore to be understood, that within the scope of the appended claims, the invention may be practiced otherwise than as specifically described.

What is claimed is:

1. A polarization rotator comprising:

a semiconductor substrate;

a multiple quantum well structure (MQW) mounted on said substrate, said MQW having a heterostructure of un-doped barrier layers and doped quantum well layers, and said MQW having a uniaxial compressive strain in the plane of said layers such that said doped quantum well layers have anisotropic radiation absorption characteristics at a first frequency;

a first source of radiation at said first frequency directed normal to said layers and linerally polarized in the plane of said layers, and having radiation components directed parallel to and perpendicular to the direction of said strain; and a second source of radiation at a second frequency directed at said MQW such that radiation absorption at said second frequency lowers the free carrier population of said doped quantum well layers and increase radiation absorption at said first frequency.

2. The polarization rotator of claim 1 wherein said doped quantum well layers comprise means for promoting exciton transitions in response to radiation absorption at said first frequency.

3. The polarization rotator of claim 2 wherein said MQW comprise means, responsive to said radiation absorption at said second frequency, for exciting free carriers out of the lower levels of said doped quantum well layers to increase the ability of said doped quantum well layers to produce said exciton transitions.

4. The polarization rotator of claim 3 wherein said first source of radiation emits visible light and second source of radiation emits infrared radiation.

5. The polarization rotator of claim 3 wherein said doped quantum well layers contain P-type dopant and said means for exciting free carriers excites holes from the lower levels into the continuum of the valence band of said doped quantum well layers.

6. The polarization rotator of claim 3 wherein said doped quantum well layers contain N-type dopant and said means for exciting free carriers excites electrons from the lower levels into the continuum of the conduction band of said doped quantum well layers.

7. An imaging system comprising:

a radiation source emitting linerally polarized radiation at a first frequency;

an image emitting radiation at a second frequency;

a polarization rotator having input means for receiving said radiations from said radiation source and said image, output means for emitting said linerally polarized radiation at said first frequency, absorption means for absorbing said radiation at said second frequency, and rotation means for rotating the polarization of said radiation at said first frequency in response to absorption of said radiation at said second frequency; and a polarizer means for transmitting a polarized component of said radiation emitted from said output means.

8. The imaging system of claim 7 wherein said polarization rotator comprises a semiconductor substrate and a multiple quantum well structure (MQW) mounted on said substrate.

9. The imaging system of claim 8 wherein said MQW comprises a heterostructure of un-doped barrier layers and doped quantum well layers with a uniaxial compressive strain in the plane of said layers such that said doped quantum well layers have anisotropic radiation absorption characteristics at said first frequency.

10. The imaging system of claim 9 wherein said radiation source includes means for emitting said linerally polarized radiation normal to the plane of said layers.

11. The imaging system of claim 10 wherein said means for emitting said linerally polarized radiation emits said linerally polarized radiation with its polarization parallel to the plane of said layers and with orthogonal radiation components directed parallel to and perpendicular to the direction of said strain.

12. The imaging system of claim 11 wherein said quantum well layers include means for producing exciton transitions in response to radiation absorption by said quantum well layers at said first frequency.

13. The imaging system of claim 12 wherein said MQW include means, responsive to said radiation absorption at said second frequency, for varying the ability of said doped quantum well layers to produce said exciton transitions by exciting free carriers out of the lower levels of said doped quantum well layers.

14. The imaging system of claim 13 wherein said radiation source emits visible light and said image emits infrared radiation.

15. The imaging system of claim 13 wherein said doped quantum well layers contain P-type dopant and said radiation absorption at said second frequency excites holes from the lower levels into the continuum of the valence band of said doped quantum well layers.

16. The imaging system of claim 13 wherein said doped quantum well layers contain N-type dopant and said radiation absorption at said second frequency excites electrons from the lower levels into the continuum of the conduction band of said doped quantum well layers.

17. A method of fabricating a polarization rotator capable of rotating the polarization of radiation at a first frequency in response to absorption of radiation at a second frequency, said method comprising the steps of:

forming a semiconductor substrate; and growing a multiple quantum well structure (MQW) on said substrate in the form of a heterostructure of un-doped barrier layers and doped quantum well layers such that exciton transitions from the highest quantum levels in the valence band to the lowest quantum level in the conduction band correspond to said first frequency and carrier transitions to continuum levels correspond to said second frequency; and producing a uniaxial compressive strain in said MQW in the plane of said layers.

18. The method of claim 17 wherein said growing step includes forming said doped quantum well layers such that said exciton transitions correspond to visible light and said carrier transitions to said continuum levels correspond to infrared radiation.

19. The method of claim 17 wherein said growing step includes doping said doped quantum well layers such that bleaching of the lowest exciton resonances occurs.

20. The method of claim 19 wherein said doping step includes forming said doped quantum well layers with P-type dopant.

21. The method of claim 19 wherein said doping step includes forming said doped quantum well layers with N-type dopant.

* * * * *